(12) United States Patent
Niekamp

(10) Patent No.: US 10,544,730 B2
(45) Date of Patent: Jan. 28, 2020

(54) ASSEMBLY FOR A CONTROLLER WITH A MAGNETIC FIELD SENSOR

(71) Applicant: Mahle International GmbH, Stuttgart (DE)

(72) Inventor: Peer Niekamp, Leutenbach (DE)

(73) Assignee: Mahle International GmbH (DE)

( * ) Notice: Subject to any disclaimer, the term of this patent is extended or adjusted under 35 U.S.C. 154(b) by 47 days.

(21) Appl. No.: 15/746,402

(22) PCT Filed: Jul. 22, 2016

(86) PCT No.: PCT/EP2016/067528
§ 371 (c)(1),
(2) Date: Jan. 19, 2018

(87) PCT Pub. No.: WO2017/013247
PCT Pub. Date: Jan. 26, 2017

(65) Prior Publication Data
US 2018/0202350 A1    Jul. 19, 2018

(30) Foreign Application Priority Data

Jul. 22, 2015   (DE) .......................... 10 2015 213 828

(51) Int. Cl.
*F02B 37/18*   (2006.01)
*F02D 9/10*   (2006.01)
(Continued)

(52) U.S. Cl.
CPC ............ *F02B 37/186* (2013.01); *F02D 9/105* (2013.01); *F02D 9/106* (2013.01); *F02M 26/48* (2016.02);
(Continued)

(58) Field of Classification Search
CPC .......... F02B 37/00–24; F02B 2037/122; F02B 2037/125; F02D 9/105; F02M 26/48;
(Continued)

(56) References Cited

U.S. PATENT DOCUMENTS 7,808,196 B2   10/2010   Hartmann et al.
8,770,544 B2   7/2014   Kim
(Continued)

FOREIGN PATENT DOCUMENTS

DE   202004010921 U1   9/2004
DE   102005040647 A1   3/2007
(Continued)

OTHER PUBLICATIONS

English abstract for DE-102005060519.
(Continued)

*Primary Examiner* — Laert Dounis
(74) *Attorney, Agent, or Firm* — Fishman Stewart PLLC

(57) ABSTRACT

An assembly for a control device may include a housing part, a shaft rotatably supported on the housing part via a bearing device separate from the housing part, and a magnetic field sensor attached to the housing part, the magnetic field sensor interacting with a magnetic element attached to the shaft for conjoint rotation to determine a rotational angle position of the shaft in relation to the housing part. A bearing element of the bearing device may be received in a housing wall portion of the housing part configured in a complementary manner to the bearing element. On a face side of the shaft facing the magnetic field sensor, a recess may be formed in which the magnetic element may be at least partially received. The housing wall portion may be configured as a web with a ring segment-shaped geometry, which may partially enclose the bearing element externally.

18 Claims, 2 Drawing Sheets

(51) Int. Cl.
  *G01D 11/24* (2006.01)
  *F02M 26/48* (2016.01)
  *G01D 5/14* (2006.01)
  *F16K 37/00* (2006.01)
  *F02M 26/67* (2016.01)

(52) U.S. Cl.
  CPC .......... *F02M 26/67* (2016.02); *F16K 37/0033* (2013.01); *G01D 11/245* (2013.01); *G01D 5/145* (2013.01); *Y02T 10/144* (2013.01)

(58) Field of Classification Search
  CPC ........... Y02T 10/144; G01P 3/44–4956; G01B 7/003–016; G01D 5/12–2525; G01D 5/26
  See application file for complete search history.

(56) References Cited

U.S. PATENT DOCUMENTS

| | | | | |
|---|---|---|---|---|
| 2001/0037794 | A1* | 11/2001 | Wayama | F02D 9/105 |
| | | | | 123/399 |
| 2005/0028871 | A1* | 2/2005 | Kurita | F02D 9/105 |
| | | | | 137/554 |
| 2008/0029054 | A1* | 2/2008 | Lancioni | F02B 31/06 |
| | | | | 123/184.21 |
| 2012/0138827 | A1 | 6/2012 | Kim | |
| 2013/0049502 | A1 | 2/2013 | Gotoh | |
| 2018/0010927 | A1* | 1/2018 | Forthaus | G01R 33/0076 |

FOREIGN PATENT DOCUMENTS

| | | | | |
|---|---|---|---|---|
| DE | 102005060519 A1 * | 6/2007 | | G01D 5/145 |
| DE | 102005060519 A1 | 6/2007 | | |
| DE | 102007034099 A1 | 1/2009 | | |
| DE | 102011118895 A1 | 5/2012 | | |
| DE | 102011120245 A1 | 6/2012 | | |
| EP | 1884636 A1 | 2/2008 | | |
| EP | 2803888 A1 | 11/2014 | | |
| WO | WO-9514911 A1 * | 6/1995 | | F02D 9/02 |

OTHER PUBLICATIONS

English abstract for DE-102007034099.
English abstract for DE-202004010921.
English abstract for EP-2803888.

* cited by examiner

ASSEMBLY FOR A CONTROLLER WITH A MAGNETIC FIELD SENSOR

CROSS-REFERENCE TO RELATED APPLICATIONS

This application claims priority to International Patent Application No. PCT/EP2016/067528, filed on Jul. 22, 2016, and German Patent Application No. DE 10 2015 213 828.3, filed on Jul. 22, 2015, the contents of both of which are incorporated herein by reference.

TECHNICAL FIELD

The invention relates to an assembly for a control device, in particular of an exhaust turbocharger, and a control device having at least one such assembly. The invention further relates to a method for producing such an assembly.

BACKGROUND

Rotatable shafts are used in a variety of ways in vehicle manufacturing as part of a control device. For example, the use of such control devices is known in wastegate valves or in variable turbine geometries of exhaust turbochargers.

Of considerable importance here on the one hand is a mechanically stable, rotatable bearing of the shaft on a housing, but on the other hand also the possibility of as accurate a determining as possible of the current rotation position of the shaft in relation to the stationary housing.

Against this background, EP1 884 636 A1 describes a variable turbine geometry with a rotatable shaft, on which a permanent magnet is arranged on the face side. Together with an evaluation element, said permanent magnet forms a rotation angle sensor.

DE 10 2011 120 245 A1 concerns an electric wastegate actuator. A rotation shaft of the actuator is coupled here to a lower portion of an installation space. At the lower end of the rotation shaft, a magnet is installed, which is coupled to a sensor arranged at the lower portion of the installation space. The magnet and the sensor form a sensor unit for determining the current rotational angle of the rotation shaft in relation to the installation space.

It is an object of the invention to indicate new ways in the rotatable mounting of shafts in a housing and in the determining, connected therewith, of the current set rotational angle of the shaft in relation to the housing.

This problem is solved by the subject of the independent claims. Preferred embodiments are the subject of the dependent claims.

SUMMARY

The basic idea of the invention is, accordingly, to mount a shaft with a magnetic element rotatably on a housing part by means of a bearing device, and to attach to this housing part a magnetic field sensor interacting with the magnetic element, so that the current rotational angle position of the shaft in relation to the housing part can be determined by the magnetic field sensor. As the magnetic field sensor is attached to the housing part in a fixed manner and the magnetic element is also arranged—via the shaft and via the bearing device—in a well-defined position in relation to the housing part with the magnetic field sensor, the sought rotational angle position in relation to the housing part can be determined with a very high degree of accuracy despite the comparatively simple structural composition.

The assembly which is presented here therefore provides a shaft rotatably supported on a housing part, which permits a precise determining of the rotational angle of the shaft relative to the housing part and nevertheless entails low production costs.

An assembly for a control device according to the invention comprises a housing part and a shaft, which is rotatably supported on the housing part by means of a bearing device separate from the housing part. A magnetic field sensor is attached to the housing part, which magnetic field sensor interacts with a magnetic element, attached to the shaft for conjoint rotation, for determining the rotational angle position of the shaft in relation to the housing part. For this, the magnetic field sensor detects changes, caused by the rotational movement of the shaft, in the magnetic field which is generated by the magnetic element.

In a preferred embodiment, the bearing device and the magnetic field sensor are attached to the same housing part. In this way, the accuracy with which the shaft can be positioned in relation to the magnetic field sensor can be considerably improved compared to conventional arrangements, in which the magnetic field sensor and the bearing device are arranged on different housing parts.

In a further preferred embodiment, an axial end portion of the shaft, facing the magnetic field sensor, can be rotatably mounted on the housing part by means of the bearing device. This provision brings it about that the shaft is mounted on the housing part in the region of the magnetic element, so that the magnetic element can be aligned precisely to the magnetic field sensor.

Particularly expediently, the magnetic element can be arranged on a face side of the shaft facing the magnetic field sensor. This provision brings it about that a particularly high magnetic coupling is achieved between magnetic element and magnetic field sensor. This, in turn, leads to an improved accuracy with which the current rotational angle position of the shaft in relation to the housing part can be determined.

The magnetic field generated by the magnetic element can be determined particularly precisely by the magnetic field sensor, by the latter being arranged on the inner side on a wall portion of the housing part and at a distance from the magnetic element. In this variant, the lateral aligning of the magnetic field sensor takes place transversely to the axial direction of the shaft such that a virtual extension straight line of the shaft meets the magnetic field sensor.

According to a further preferred embodiment, the bearing device comprises a bearing element, configured in a sleeve-like manner, through which the shaft is able to be inserted. This simplifies the mounting of the shaft in the bearing device, without an undesired reduction of the achievable positioning accuracy being thereby involved.

Cost advantages in the production can be achieved in a further preferred embodiment, according to which the bearing device comprises precisely one bearing element, so that the shaft is mounted on the housing part by means of a single sleeve-shaped bearing element. However, the use of two or more bearing elements which are arranged axially at a distance from one another and are fastened to the housing part is also conceivable. Also, the provision of further bearing elements which are fastened to additional housing parts is also conceivable.

For a permanently stable fastening of the magnetic elements to the shaft, it is proposed in a further preferred embodiment to form a recess on the face side of the shaft facing the magnetic field sensor, in which recess the magnetic element is able to be received, or is received, at least partially, preferably completely.

In another preferred embodiment, the bearing device has a bearing element configured in a pot-shaped manner, which encapsulates the magnetic element, therefore partially encloses it. Preferably, the magnetic element can be received in the recess. This configuration brings about a protection of the magnetic element from electrical flashovers.

Particularly preferably, the pot-like bearing element has a pot base which is arranged axially between the magnetic element and the magnetic field sensor. The pot base is preferably formed integrally on the bearing element. This variant is particularly simple to produce.

In an advantageous further development, the pot base covers the recess with the magnetic element. In this way, the magnetic field sensor can be protected effectively against an electrical flashover and against any damage or destruction involved therewith.

In another preferred embodiment, the bearing device comprises a bearing element which, in a longitudinal section along the rotation axis of the shaft, has an H-shaped geometry with a first and second recess. The two recesses serve to receive the magnetic element or respectively the magnetic field sensor. The two recesses lie opposite one another along an axial direction defined through the rotation axis. In the first recess, the shaft is rotatably supported with the magnetic element. The magnetic field sensor is received in the second recess. In this way, the magnetic field sensor can be protected particularly effectively against an electrical flashover and against a damage or even destruction involved therewith.

Particularly expediently, the bearing element can rest on the housing part in the region of the wall portion, so that it encloses the magnetic field sensor which is arranged in the second recess. In this variant, the housing part undertakes the function of an axial stop for the bearing element. Therefore, the latter can be positioned particularly precisely in relation to the housing part.

Particularly preferably, the housing part is configured as an injection moulded part. This permits a favourably priced production of the housing part from a plastic, on which the further components of the assembly, in particular the bearing device, which is preferably likewise produced from plastic, and/or the magnetic field sensor and/or the magnetic element, can be fastened by means of pressing in.

Therefore, the fixing of the magnetic field sensor by means of casting or bonding or by means of a stamping connection or by means of a welded connection to the housing part is recommended as particularly expedient. All the named fastening methods ensure a permanent fastening with, at the same time, low costs for implementation.

A permanent and particularly stable fastening of the bearing element of the bearing device to the housing part can be achieved when the bearing element is received in a housing wall portion of the housing part which is configured in a complementary manner to the bearing device.

Particularly preferably, said housing wall portion is configured in the manner of a ring-shaped web with ring segment-shaped geometry, in which the bearing element is able to be received. In such a state, received in the web which is configured in manner of a ring segment, an outer circumferential surface of the bearing element can lie flatly against an inner circumferential surface of the ring-shaped web. In such a scenario, the sleeve-like bearing element is enclosed partially by the web with ring segment-like geometry.

In another preferred embodiment, the magnetic field sensor is arranged on the housing part such that with respect to a top view onto the housing part in axial direction of the rotation shaft it is not covered by the web with said ring segment-shaped geometry. This facilitates the mounting of the sensor on the housing part, because it can be placed and fastened before the inserting of the bearing element into the housing part.

Alternatively, the ring segment can also be embodied so as to be closed. In this case, a lateral opening is formed under the ring segment, through which the magnetic field sensor can be placed and fastened under the ring segment. Such an opening can be realized for example during the production of the housing part by means of an injection moulding process by a drag-type and/or lateral slide.

Particularly expediently, an axial distance of the magnetic element to the magnetic field sensor is a maximum of 20 mm, preferably a maximum of 5 mm. Alternatively or additionally, an axial distance of the bearing element to the magnetic field sensor is a maximum of 30 mm, preferably a maximum of 20 mm. Both provisions, individually or in combination, promote a precise positioning of the magnetic element at a small distance from the magnetic field sensor. This leads to an improved accuracy, by means of which the sought rotational angle of the shaft in relation to the housing part can be determined.

Particularly preferably, the bearing device, in particular the bearing element, can be fastened to the housing part by means of pressing in. This leads to a further reduction of the manufacturing costs, because complex provisions for fastening the bearing device, in particular the bearing element, to the housing part are dispensed with.

Alternatively, a fastening of the bearing device, in particular of the bearing element, by means of pressing in or by means of a stamping connection or by means of a form fit, in particular by means of at least one snap-in hook, which is fastened to the housing part, is recommended.

The invention further relates to a control device of a variable turbine geometry or of a wastegate device, respectively of an exhaust turbocharger for a motor vehicle, with at least one assembly which has been presented above.

The invention also concerns a control device of a valve device of an exhaust recirculation system for a motor vehicle with at least one assembly which has been presented above.

The invention furthermore relates to a control device of a flap valve, in particular of a fresh air system for a motor vehicle, with at least one assembly which has been presented above.

The invention further relates to a method for producing an assembly, in particular the assembly which has been explained above.

In a method step a) a housing part is provided, on which a housing wall portion, configured as a web with a ring segment-shaped geometry, is provided for receiving a bearing element. In a further method step b) the magnetic field sensor is guided through the ring segment-shaped web, therefore through the through-opening which is partially enclosed by the web, and subsequently arranged on the housing part.

In a further step c) the bearing element is attached to the housing wall portion of the housing part, and namely preferably by means of pressing in.

The ring segment-like geometry of the web therefore permits a mounting of the magnetic field sensor before the attaching of the bearing element to the housing part. This facilitates the putting together of the assembly.

In an advantageous further development, the shaft is partially inserted with the magnetic element through the through-opening which is provided in the bearing device. This takes place such that the shaft is mounted rotatably on the housing part by means of an axial end portion, and the magnetic field sensor, inserted through the bearing device, interacts with the magnetic element for determining the rotational angle position of the shaft in relation to the housing part.

In a particularly preferred embodiment, the method according to the invention comprises a step a0), preceding the method step a), according to which an evaluation unit is fastened to the housing part. In this variant, the evaluation unit is therefore pre-mounted on the housing part before the mounting of the bearing device. Therefore, the evaluation unit can be electrically wired in a readily accessible manner for an operator before the mounting of bearing device and shaft on the housing part.

In a preferred embodiment, the fastening of the evaluation unit on the housing part takes place by means of injecting around the housing part, preferably with a plastic.

In an advantageous further development, the method has a step x) following the step b) or c), according to which the magnetic field sensor is electrically connected to the evaluation unit.

Preferably, the housing part is produced by means of a plastic injection method. This leads to reduced manufacturing costs, especially as the central components of the assembly such as the bearing device or respectively the magnetic field sensor can be fastened to the housing part by means of pressing in or respectively casting, bonding, by means of stamping in or by means of a welded connection.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
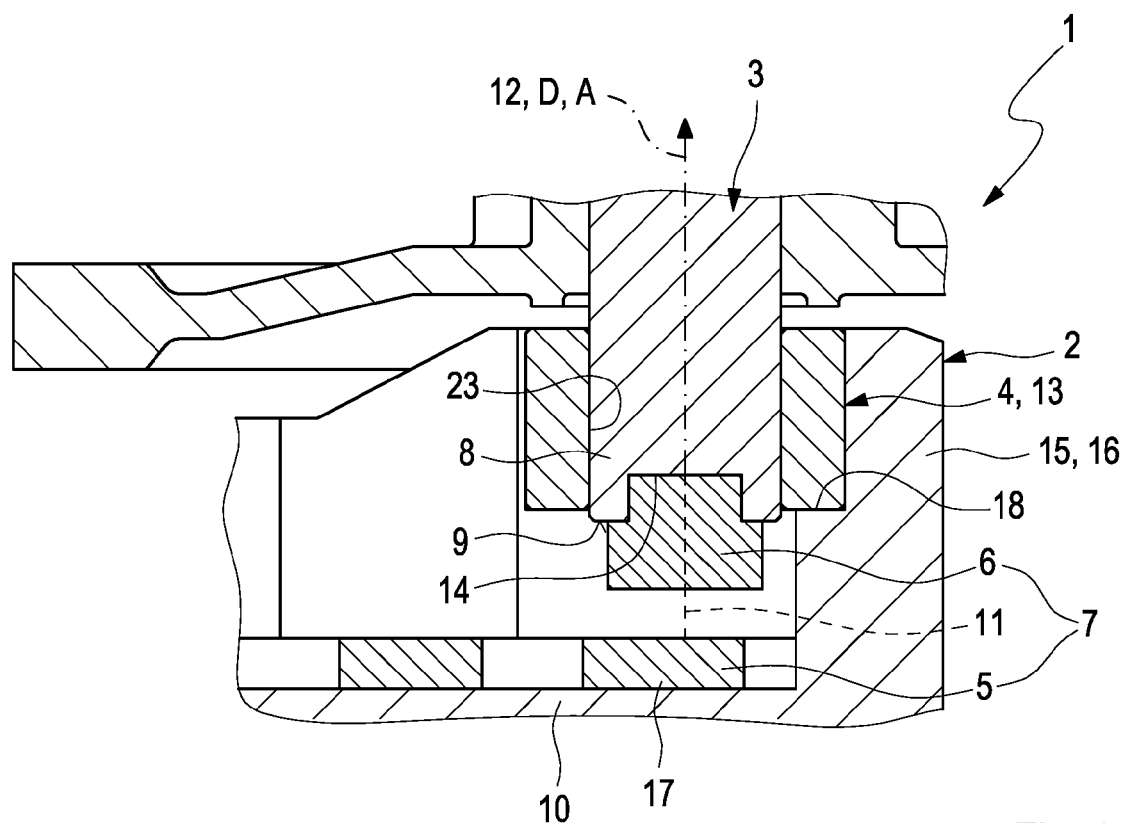
FIG. 1 an example of an assembly according to the invention.

FIG. 1 shows an example of an assembly 1 according to the invention. This comprises a housing part 2 and a shaft 3. The shaft 3 is rotatably mounted on the housing part 2 by means of a bearing device 4 separate from the housing part 2. The shaft 3 can be configured in the manner of a cylinder, through the central longitudinal axis 12 of which a rotation axis D of the shaft 3 is defined. Through the central longitudinal axis 12 in addition an axial direction A of the shaft 3 is defined.

The bearing device 4 and the magnetic field sensor 5 are attached, fixedly respectively, to the same housing part 2. Preferably, the housing part 2 is configured as an injection moulded part from a plastic. Preferably, the magnetic field sensor 5 is fixed to the housing part 2 by means of casting, bonding, or by means of a stamping connection or by means of welding. According to FIG. 1, the rotatable mounting of the shaft 3 takes place by means of the bearing device 4 via an axial end portion 8 of the shaft facing the magnetic field sensor 5. For this, the bearing device 4 comprises a bearing element 13, configured in a sleeve-like manner, through which the shaft 3 can be inserted during mounting. Preferably, the bearing device 4 comprises precisely one such bearing element 13, but also two or more such bearing elements are conceivable, which are arranged an axial direction A at a distance to one another (not shown in the example of the figures). Also, a plastic comes into consideration for the material for the bearing device 4 or respectively for the bearing element 13. However, other materials or bearing technologies, such as roller bearings, are also conceivable.

As FIG. 1 shows, a magnetic field sensor 5 is fixedly attached to the housing part 2, and a magnetic element 6 is provided for conjoint rotation on the shaft 3. The magnetic element 6 can comprise a permanent magnet generating a magnetic field. The magnetic element 6 is arranged on a face side 9 of the shaft 3 facing the magnetic field sensor 5. The magnetic element 6 and the magnetic field sensor 5 form together a rotation angle sensor 7.

To determine the rotational angle position of the shaft 3 in relation to the housing part 2, the magnetic field sensor 5 interacts with the magnetic element 6. This takes place such that the magnetic field sensor 5 detects changes in the magnetic field generated by the magnetic element 6, which are caused by the rotation of the shaft 3 in relation to the housing part 2 and therefore to the magnetic field sensor 5. The magnetic field sensor 5 can be configured for example as a Hall sensor, which is electrically connected to an electronic evaluation device 17. The evaluation device 17, which can be realized for instance as an integrated circuit (IC), evaluates the sensor data generated by the Hall sensor and converts this into electronic signals, which can be further processed by a control apparatus (not shown). The electronic evaluation device 17 can also be secured to the housing part 2.

As the illustration of FIG. 1 clearly demonstrates, the magnetic field sensor 5 is preferably arranged on the inner side on a wall portion 120 of the housing part 2 and at a distance from the magnetic element 6. The arrangement of the magnetic field sensor 5 takes place in relation to the magnetic element 6 such that a virtual extension straight line 11 of the centre longitudinal axis 12 of the shaft 3 meets the magnetic field sensor 5. In this way, a good magnetic coupling can be achieved between the magnetic element 6 and the magnetic field sensor 5. In a received state in the bearing element 13, the face side 9 of the shaft 3 with the magnetic element 6 protrudes axially beyond the sleeve-like bearing element 13 towards the magnetic field sensor 5. On the face side 9 of the shaft 3, facing the magnetic field sensor 5, a recess 14 is formed, in which the magnetic element 6 is at least partially received. In this way, the magnetic element 6 can be fastened to the shaft 3 in a mechanically stable manner. For this, the magnetic element 6 can be glued into the recess 14. The face side 9 of the shaft 3 with the magnetic element 6 is arranged axially between the magnetic field sensor 5 and the bearing device 4 with the bearing element 13.

Figure 2:
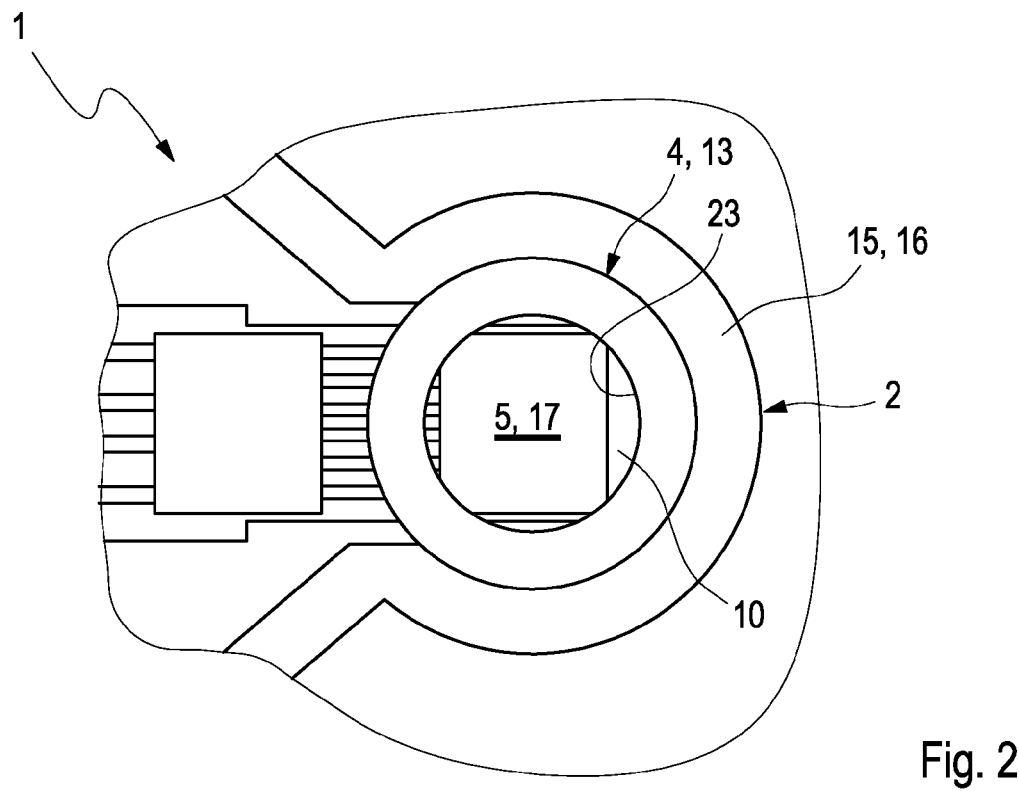
FIG. 2 the housing part of the assembly in a region of the bearing device.

The illustration of FIG. 2 shows the housing part 2 in a region of the bearing device 4, but without the shaft 3 inserted through the bearing element 13. It can be seen that the bearing element 13, configured in a sleeve-like manner, is received in a housing wall portion 15 of the housing part 2 which is configured in a complementary manner to the bearing element 13. Said housing wall portion 15 is configured as a web 16 with ring segment-shaped geometry and partially encloses the sleeve-like bearing element 13 on the outer circumferential side. It can be seen from FIG. 2 that the magnetic field sensor 5 in a top view onto the housing part 2 along the axial direction A of the rotation shaft 3 is not covered by the web 16 which is configured in a ring segment-like manner. Such an arrangement facilitates the mounting of the magnetic field sensor 5 on the housing part 2 in the region of the wall portion 10, when the magnetic field sensor 5 is placed and fastened before the inserting of the bearing device 4 with the bearing element 13 in the housing part 2. Preferably, the bearing element 13 is fastened to the housing wall portion 15 or respectively to the web 16 of the housing part by means of pressing in or by means of a stamping connection.

For an effective magnetic coupling of magnetic field sensor 5 and magnetic element 6 to one another, an axial distance of the magnetic element 6 to the magnetic field sensor 5 of the rotation angle sensor 7, measured along the virtual extension straight line 11, is a maximum of 20 mm, preferably a maximum of 5 mm. Likewise, the axial distance of the bearing element 13 to the magnetic field sensor 5, also measured along the virtual extension straight line 11, is a maximum of 30 mm, preferably a maximum of 20 mm.

The assembly 1 which has been explained above is distinguished by a particularly simple manufacture and assemblabilty, because the housing part 2 can be produced as an injection moulded part from a plastic at a favourable cost by means of an injection moulding method. The bearing device 4 with the bearing element 13, which is preferably likewise made from a plastic, can be pressed into such an injection moulded part in a simple manner. This applies in particular to the case in which, as described above, a housing wall portion 15 with a geometry configured in a complementary manner to the bearing element 13 as part of the injection moulded part is available for this on the housing part 2.

For the axial positioning of the bearing element 13, a radial step 18, acting as an axial stop, can be formed on the housing wall portion 15 (cf. FIG. 1). Alternatively thereto, it is also conceivable to equip the bearing element 13 with a collar (not shown), which likewise follows the operating principle of an axial stop.

The magnetic element 6 can be simply fastened in a mechanically stable manner on the rotation shaft 3 by means of casting, bonding or by means of pressing in or by means of a stamping connection. The magnetic field sensor 5 can likewise be simply fastened to the housing part 2 in a mechanically stable manner by means of casting, bonding or by means of a stamping connection or by means of a welded connection. The pressing in of the bearing device 4 can also take place before the attaching of the magnetic field sensor 5 which is to be fastened to the housing part 2. Alternatively thereto, the bearing device 4 or respectively the bearing element 13 can also by fastened to the housing part 2 by means of a stamping connection or a form fit, for example by means of snap-in hooks.

By a simple inserting of the shaft 3 through the sleeve-shaped bearing element 13, the shaft 3 can also be positioned laterally, therefore transversely to the axial direction A, in an extremely precise manner in relation to the housing part 2. At the same time, an extremely robust, rotatable bearing of the shaft 3 on the housing part 2 is produced. As a result, the assembly 1 which is presented here can therefore be put together in a simple manner. Considerable cost advantages result herefrom for the production of the assembly 1.

The putting together of the assembly 1 according to FIG. 1 is explained below. In one method step, the housing part 2 is provided, on which a housing wall portion 15, configured as a web 16 with ring segment-shaped geometry is provided for receiving a bearing element 13.

In a further method step, firstly the evaluation unit 17 can be fastened to the housing part 2, by means of which the sensor data, provided by the magnetic field sensor 5, can be evaluated. This process can also include an electrical wiring of the evaluation unit 17. The fastening of the evaluation unit 17 to the housing part 2 can take place by injecting around the housing part 2 with a plastic.

In a further method step, the magnetic field sensor 5 is guided through the ring segment-shaped web 16, therefore through the through-opening partially enclosed by the web, and is subsequently arranged on the housing part 2.

In a further method step, the bearing element 13 is attached to the housing wall portion 15 of the housing part 2, and namely preferably by means of pressing in. Preferably, the housing wall portion 15 is configured in a complementary manner to the bearing element 13. This facilitates the mounting, in particular the pressing in of the bearing element 13, on the housing part 2. The ring segment-like geometry of the web 16 therefore permits a mounting of the magnetic field sensor 5 before attaching of the bearing element 13 to the housing part 2. This facilitates the putting together of the assembly 1.

In a further method step, the shaft 3 with the magnetic element 6 can be partially guided through the through-opening 23 provided in the bearing device 4. This takes place such that the shaft 3 is rotatably mounted on the bearing device 3 of the housing part 2 by means of an axial end portion 8. In this way, the magnetic field sensor 5, guided through the bearing device 4, can interact with the magnetic element 6 for determining the rotational angle position of the shaft 3 in relation to the housing part 2.

In a further method step, the magnetic field sensor 5 is/can be electrically connected to the evaluation unit 17.

Figure 3:
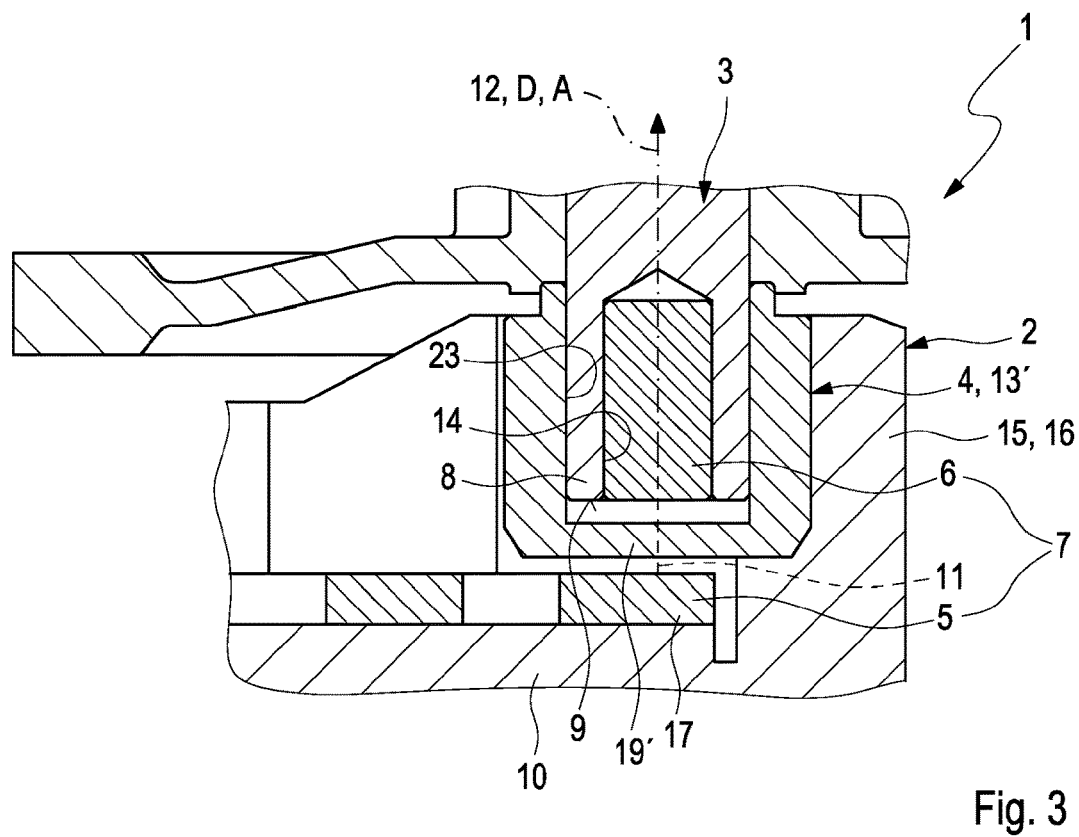
FIG. 3 a first variant of the example of FIG. 1.

FIG. 3 shows a variant of the example of FIG. 1. In the example of FIG. 3, the bearing device 4 of the assembly 1 comprises a bearing element 13', configured in a pot-like manner, which encapsulates the magnetic element which is received in the recess 14. Here, the pot-like bearing element 13' has a pot base 19', which is arranged axially between the magnetic element 6 and the magnetic field sensor 5. The pot base 19' is preferably formed integrally on the bearing element 13'. According to FIG. 3, the pot base 19' covers the recess 13 with the magnetic element 6.

Figure 4:
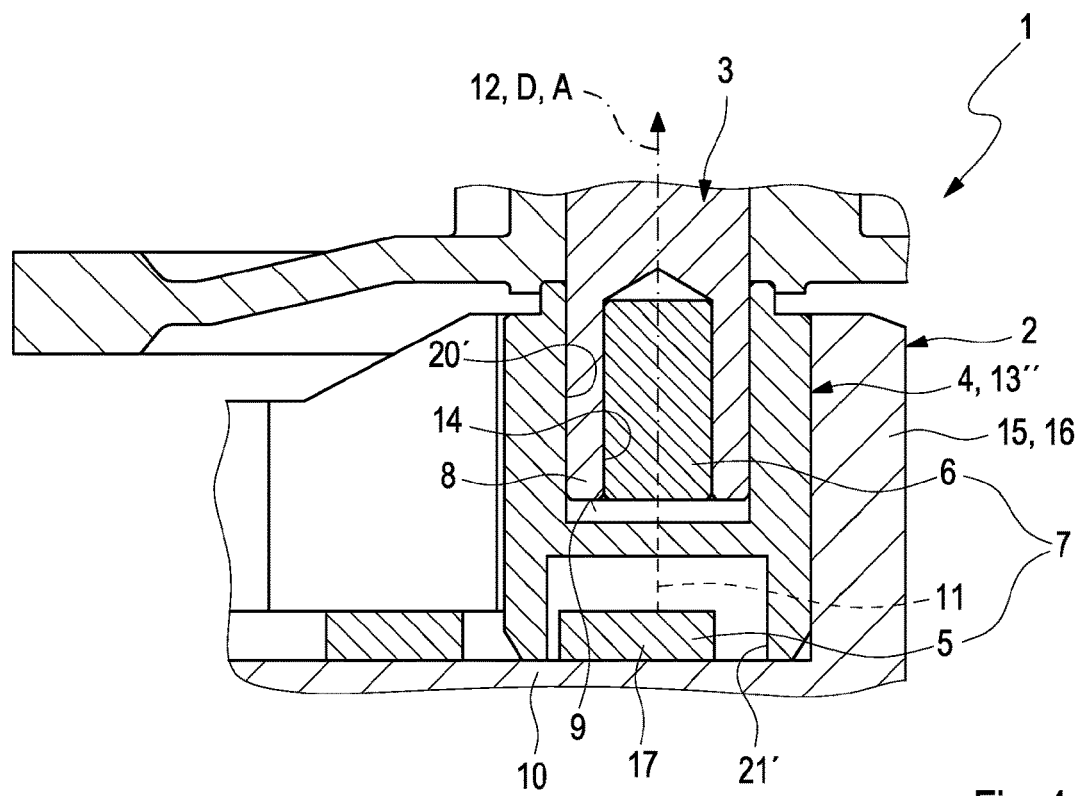
FIG. 4 a second variant of the example of FIG. 2.

FIG. 4 shows a further variant of the example of FIG. 1. FIG. 4 shows the assembly 1 in a longitudinal section along a rotation axis D of the shaft 3. Through the rotation axis D an axial direction A is defined. In the example of FIG. 4, the bearing device 4 of the assembly 1 comprises a bearing element 13", which has an H-shaped geometry in the longitudinal section along the rotation axis D of the shaft 3. The bearing element 13" has in the longitudinal section a first and a second recess 20', 21', which lie opposite one another in the axial direction A. As can be seen from FIG. 4, the shaft 3 with the magnetic element 6 is rotatably mounted in the first recess 20'. The magnetic field sensor 5 is arranged in the second recess 21'. The bearing element 13" rests on the housing part 2 in the region of the wall portion 10, so that it encloses the magnetic field sensor 5 which is arranged in the second recess 21'.

The invention claimed is:

1. An assembly for a controller, the assembly comprising:
a housing part;
a shaft rotatably supported on the housing part via a bearing device separate from the housing part;
a magnetic field sensor attached to the housing part, the magnetic field sensor interacting with a magnetic element attached to the shaft for conjoint rotation to determine a rotational angle position of the shaft in relation to the housing part;
wherein a bearing element of the bearing device is received in a housing wall portion of the housing part configured in a complementary manner to the bearing element;
wherein on a face side of the shaft facing the magnetic field sensor, a recess is formed in which the magnetic element is at least partially received;
wherein the housing wall portion is configured as a web with a ring segment-shaped geometry, which partially encloses the bearing element externally; and
wherein the bearing element is configured in a pot-like manner, the bearing element encapsulating the magnetic element that is received in the recess.

2. The assembly according to claim 1, wherein the bearing device and the magnetic field sensor are attached to the housing part.

3. The assembly according to claim 1, wherein an axial end portion of the shaft facing the magnetic field sensor is mounted rotatably on the housing part via the bearing device.

4. The assembly according to claim 1, wherein the magnetic element is arranged on the face side of the shaft facing the magnetic field sensor.

5. The assembly according to claim 1, wherein the magnetic field sensor is arranged on an inner side on a wall portion of the housing part and at a distance from the magnetic element, such that a virtual extension straight line of the shaft meets the magnetic field sensor.

6. The assembly according to claim 1, the bearing element is configured in a sleeve-like manner, the shaft being insertable through the bearing element.

7. The assembly according to claim 1, wherein the bearing element has a pot base arranged axially between the magnetic element and the magnetic field sensor.

8. The assembly according to claim 7, wherein the pot base covers the recess with the magnetic element.

9. The assembly according to claim 1, wherein the bearing element, in a longitudinal section along a rotation axis of the shaft, has an H-shaped geometry with a first recess and a second recess, which lie opposite one another along an axial direction defined through the rotation axis, wherein the shaft with the magnetic element is rotatably mounted in the first recess, and the magnetic field sensor is arranged in the second recess.

10. The assembly according to claim 9, wherein the bearing element rests in a region of the wall portion on the housing part so that the bearing element encloses the magnetic field sensor arranged in the second recess.

11. The assembly according to claim 10, wherein the magnetic field sensor, with respect to a top view onto the housing part in the axial direction, is not covered by the web with the ring segment-shaped geometry.

12. The assembly according to claim 2, wherein an axial end portion of the shaft facing the magnetic field sensor is mounted rotatably on the housing part via the bearing device.

13. The assembly according to claim 2, wherein the magnetic element is arranged on the face side of the shaft facing the magnetic field sensor.

14. The assembly according to claim 2, wherein the magnetic field sensor is arranged on an inner side on a wall portion of the housing part and at a distance from the magnetic element, such that a virtual extension straight line of the shaft meets the magnetic field sensor.

15. The assembly according to claim 2, the bearing element is configured in a sleeve-like manner, the shaft being insertable through the bearing element.

16. A controller of a variable turbine geometry or a wastegate device of an exhaust turbocharger for a motor vehicle, the controller comprising at least one assembly having:
a housing part;
a shaft rotatably supported on the housing part via a bearing device separate from the housing part;
a magnetic field sensor attached to the housing part, the magnetic field sensor interacting with a magnetic element attached to the shaft for conjoint rotation to determine a rotational angle position of the shaft in relation to the housing part;
wherein a bearing element is received in a housing wall portion of the housing part configured in a complementary manner to the bearing element;
wherein on a face side of the shaft facing the magnetic field sensor, a recess is formed in which the magnetic element is at least partially received;
wherein the housing wall portion is configured as a web with a ring segment-shaped geometry, which partially encloses the bearing element externally; and
wherein the bearing element, in a longitudinal section along a rotation axis of the shaft, has an H-shaped geometry with a first recess and a second recess, which lie opposite one another along an axial direction defined through the rotation axis, wherein the shaft with the magnetic element is rotatably mounted in the first recess, and the magnetic field sensor is arranged in the second recess.

17. A controller of a valve device of an exhaust recirculation system for a motor vehicle, the controller comprising at least one assembly having:
a housing part;
a shaft rotatably supported on the housing part via a bearing device separate from the housing part;
a magnetic field sensor attached to the housing part, the magnetic field sensor interacting with a magnetic element attached to the shaft for conjoint rotation to determine a rotational angle position of the shaft in relation to the housing part;
wherein a bearing element is received in a housing wall portion of the housing part configured in a complementary manner to the bearing element;
wherein on a face side of the shaft facing the magnetic field sensor, a recess is formed in which the magnetic element is at least partially received;
wherein the housing wall portion is configured as a web with a ring segment-shaped geometry, which partially encloses the bearing element externally; and
wherein the bearing element is configured in a pot-like manner, the bearing element encapsulating the magnetic element that is received in the recess.

18. A controller of a flap valve, the controller comprising at least one assembly having:
a housing part;

a shaft rotatably supported on the housing part via a bearing device separate from the housing part;

a magnetic field sensor attached to the housing part, the magnetic field sensor interacting with a magnetic element attached to the shaft for conjoint rotation to determine a rotational angle position of the shaft in relation to the housing part;

wherein a bearing element is received in a housing wall portion of the housing part configured in a complementary manner to the bearing element;

wherein on a face side of the shaft facing the magnetic field sensor, a recess is formed in which the magnetic element is at least partially received;

wherein the housing wall portion is configured as a web with a ring segment-shaped geometry, which partially encloses the bearing element externally; and wherein the bearing element is configured in a pot-like manner, the bearing element encapsulating the magnetic element that is received in the recess.

* * * * *